United States Patent
Horii et al.

(10) Patent No.: US 6,186,550 B1
(45) Date of Patent: Feb. 13, 2001

(54) FRAME STRUCTURE INCLUDING INTEGRATED OIL TANK

(75) Inventors: Yoshiyuki Horii; Toshio Matsuno, both of Saitama (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/393,816

(22) Filed: Sep. 10, 1999

(30) Foreign Application Priority Data

Sep. 11, 1998 (JP) .................................................. 10-276572

(51) Int. Cl.⁷ .................................................. B62D 61/02
(52) U.S. Cl. ............................ 280/833; 280/831; 180/225
(58) Field of Search .................................. 180/225, 219, 180/229; 280/833, 830, 831, 835, 288.4; 296/205

(56) References Cited

U.S. PATENT DOCUMENTS

| | | | |
|---|---|---|---|
| 3,945,463 | * 3/1976 | Okano et al. | 184/6.13 |
| 4,690,236 | * 9/1987 | Shinozaki et al. | 180/219 |
| 5,054,571 | * 10/1991 | Takasaka | 180/219 |
| 5,701,853 | * 12/1997 | Takahashi | 123/41.33 |

FOREIGN PATENT DOCUMENTS

| | | |
|---|---|---|
| 3-82687 | * 4/1991 | (JP) . |
| 1071983 | 3/1998 | (JP) . |
| 10-67375 | * 3/1998 | (JP) . |

* cited by examiner

*Primary Examiner*—Brian L. Johnson
*Assistant Examiner*—Avraham H. Lerner

(57) ABSTRACT

A vehicle body frame is formed by a head portion, a main pipe, a center pipe, a pivot frame, lower pipes and a down pipe. The head portion is a casting integrally formed with a head pipe. An oil tank is formed by a main body portion of the head portion, the down pipe, and a joint piece which is connected at a lower end thereof to the lower pipes. A tank space is formed in the main body portion, and a seal wall is integrally formed in the tank space for prohibiting the tank space from communicating with the main pipe. A number of ribs are integrally installed at an inner wall face of the tank space. The oil tank built into the frame of the present invention reduces the number and lengths of welds requiring liquid-tight performance to be as small as possible and as short as possible, and eliminates the need to hermetically seal the main pipe.

20 Claims, 7 Drawing Sheets

FRAME STRUCTURE INCLUDING INTEGRATED OIL TANK

BACKGROUND OF THE INVENTION

1. Field of the Invention

The present invention relates to a frame structure of a motorcycle including an oil tank integrated into the frame structure.

2. Description of the Background Art

It is known to utilize an inner portion of a vehicle body frame as an oil tank. One example is shown in JP-A-10-71983, wherein respective inner spaces of frame portions are utilized as an oil tank. The oil tank is formed in a main pipe extending rearwardly from a head pipe, a down pipe extending downwardly from the head pipe, as well as a reinforcement pipe connecting the main pipe and the down pipe.

When the oil tank is formed as described above, a rear portion of the main pipe must be hermetically sealed. Further, respective connecting portions must be welded in a liquid-tight manner, and a connector of a gauge or the like must similarly be welded in a liquid-tight manner. When hermetically sealing an end portion of the main pipe, and when the number and length of weld portions requiring liquid-tight performance are increased in this way, much time and labor is needed. Therefore, it is desired to dispense with hermetically sealing of such an end portion of the main pipe and to make the number and lengths of the weld portions requiring liquid-tight performance as small as possible and as short as possible.

SUMMARY OF THE INVENTION

In order to solve the above problem, according to a first aspect of the present invention, a frame integrated oil tank is provided in a motorcycle having a vehicle body frame. The body frame includes a head portion integrally formed with a head pipe. A main pipe extends rearwardly from the head portion above an upper side of an engine. A down pipe extends downwardly from the head portion at a front side of the engine. The head portion is a hollow casting integrally formed with a main body portion having joint portions for joining with the main pipe, the down pipe, and the head pipe. An oil tank is formed by communicating respective inner spaces of the main body portion and the down pipe. The joint portion joining the head portion with the main pipe is integrally formed with a seal wall for prohibiting the oil tank from communicating with the main pipe.

Accordingly, the only welds requiring liquid-tight performance for constituting the oil tank are a weld between the joint portion of the head portion and the down pipe, and a weld for closing a lower end portion of the down pipe. Additional welding requiring liquid-tight performance at connecting portions of respective members and weld portions of other attaching parts as in the conventional example can be dispensed with.

As a result, a number of the welds requesting liquid-tight performance can be made as small as possible and weld lengths can be made as short as possible. Further, by integrally forming the seal wall in the head portion, a step of hermetically sealing the main pipe can be omitted and accordingly, assembling of the vehicle body frame is facilitated.

According to a second aspect of the present invention, a plurality of ribs are integrally formed in the inner space of the main body portion. Accordingly, even when a hollow portion having a large capacity is constituted by utilizing the inside of the main body portion as a portion of the oil tank, sufficient strength can be provided. Further, the inner surface area of the oil tank can be enlarged and therefore, the cooling efficiency can be promoted by expediting heat radiation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 2:
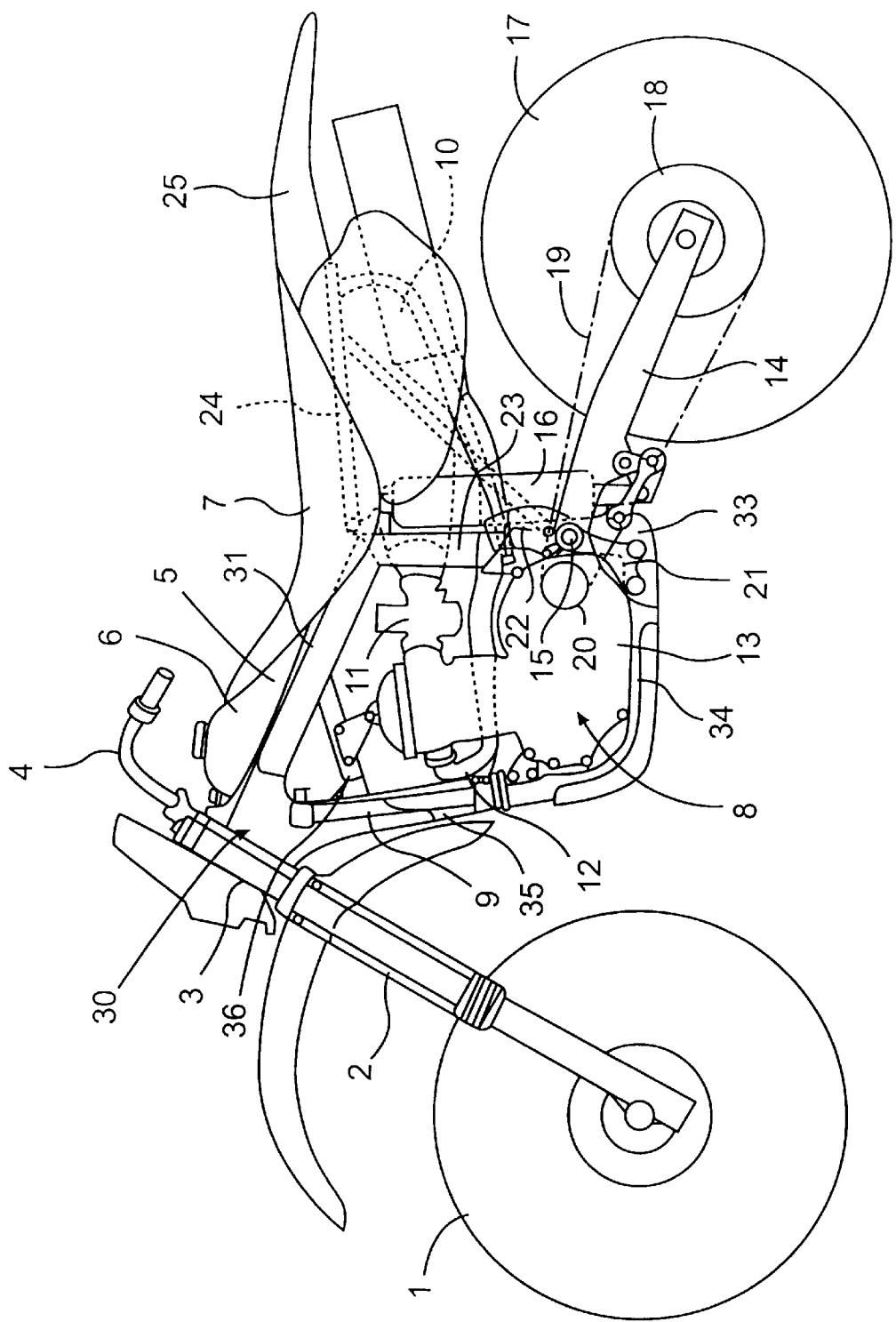
FIG. 2 is a side view of a motorcycle to which the embodiment is applied.

An explanation will be given of an embodiment with reference to the drawings. First, an explanation will be given of a motorcycle with reference to FIG. 2. An upper portion of a front fork 2 supporting a front end 1 is attached to a head pipe 3 which is supported by a front end portion of a vehicle body frame 5. The front fork 2 is pivotable by a handle 4. The vehicle body frame 5 is of a cradle type. An upper portion of the body frame 5 supports a fuel tank 6 and a seat 7, and a lower side thereof supports an engine 8.

The engine 8 is of a water-cooled type, and is cooled by a radiator 9. The engine 8 takes in air from an air cleaner 10 arranged on the lower side of the seat 7 via a carburetor 11, and exhausts gas from an exhaust port via an exhaust pipe 12. Front end portions of a rear swing arm 14 are supported at a portion of the vehicle body frame 5 disposed on the rear side of a crank case 13 of the engine 8 by a pivot shaft 15. The rear swing arm 14 is swingable in the up and down direction. A rear cushion unit 16 is installed between the rear swing arm 14 and the vehicle body frame 5.

A rear wheel 17 is supported by rear end portions of the rear swing arm 14. The rear wheel 17 is driven by a drive side sprocket 20 of the crank case 13 via a chain 19 along with a driven side sprocket 18 coaxially installed therewith. Numeral 21 designates a step bracket, numeral 22 designates a chain protector, numeral 23 designates a rear stay, numeral 24 designates a seat rail and numeral 25 designates a rear fender.

Figure 3:
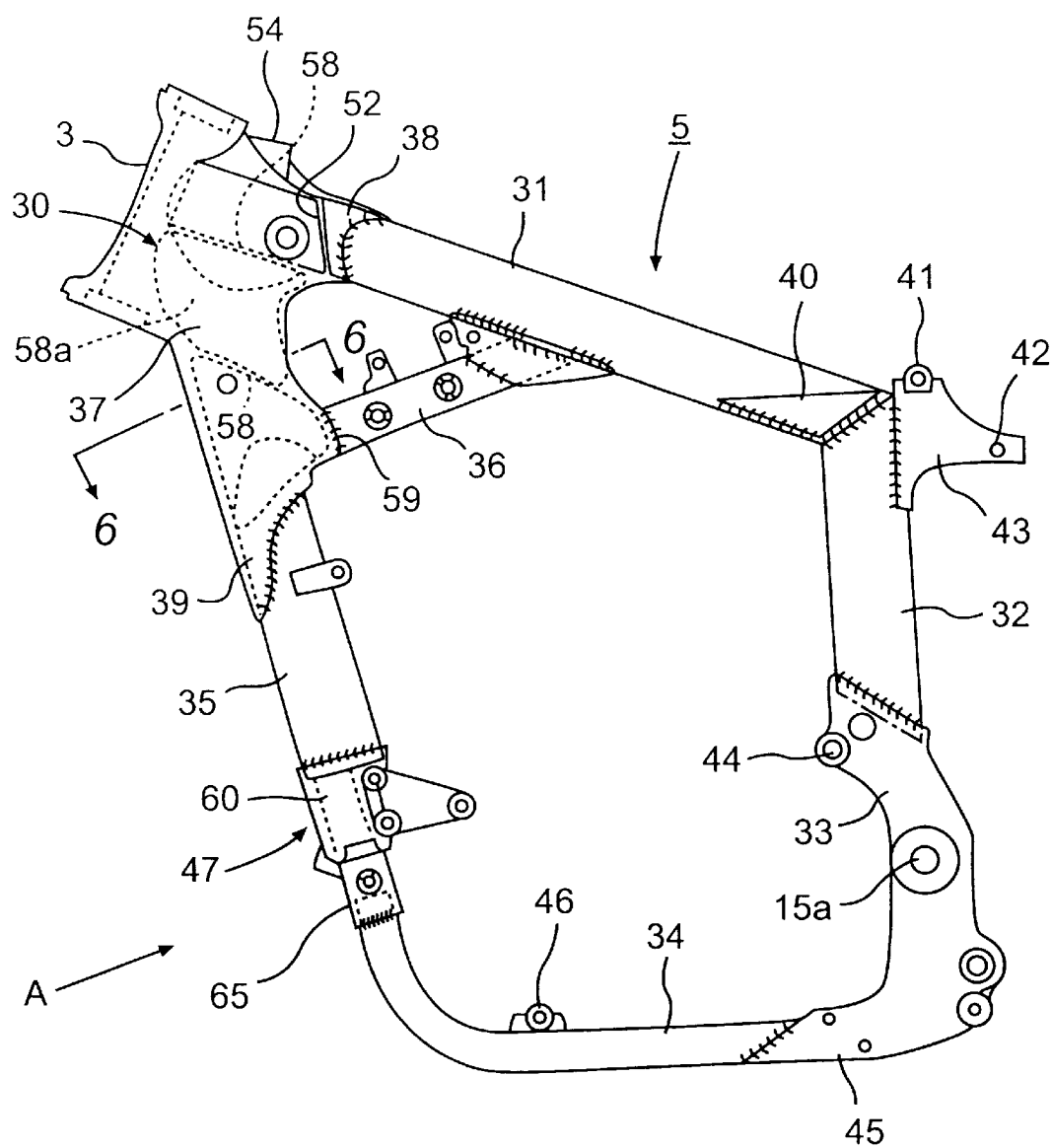
FIG. 3 is a side view of a front portion of a vehicle body frame.
Figure 4:
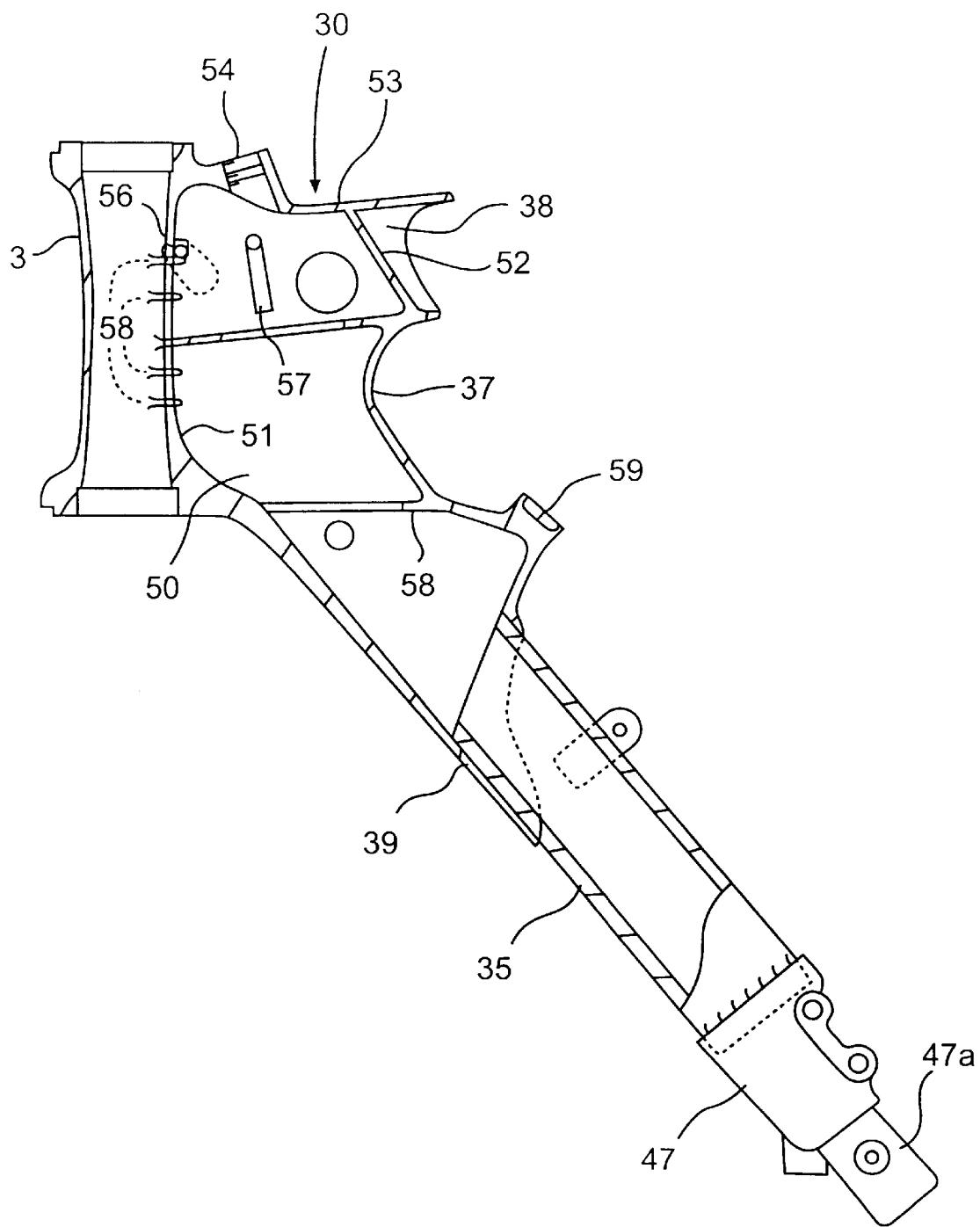
FIG. 4 is a sectional view of an oil tank portion.
Figure 5:
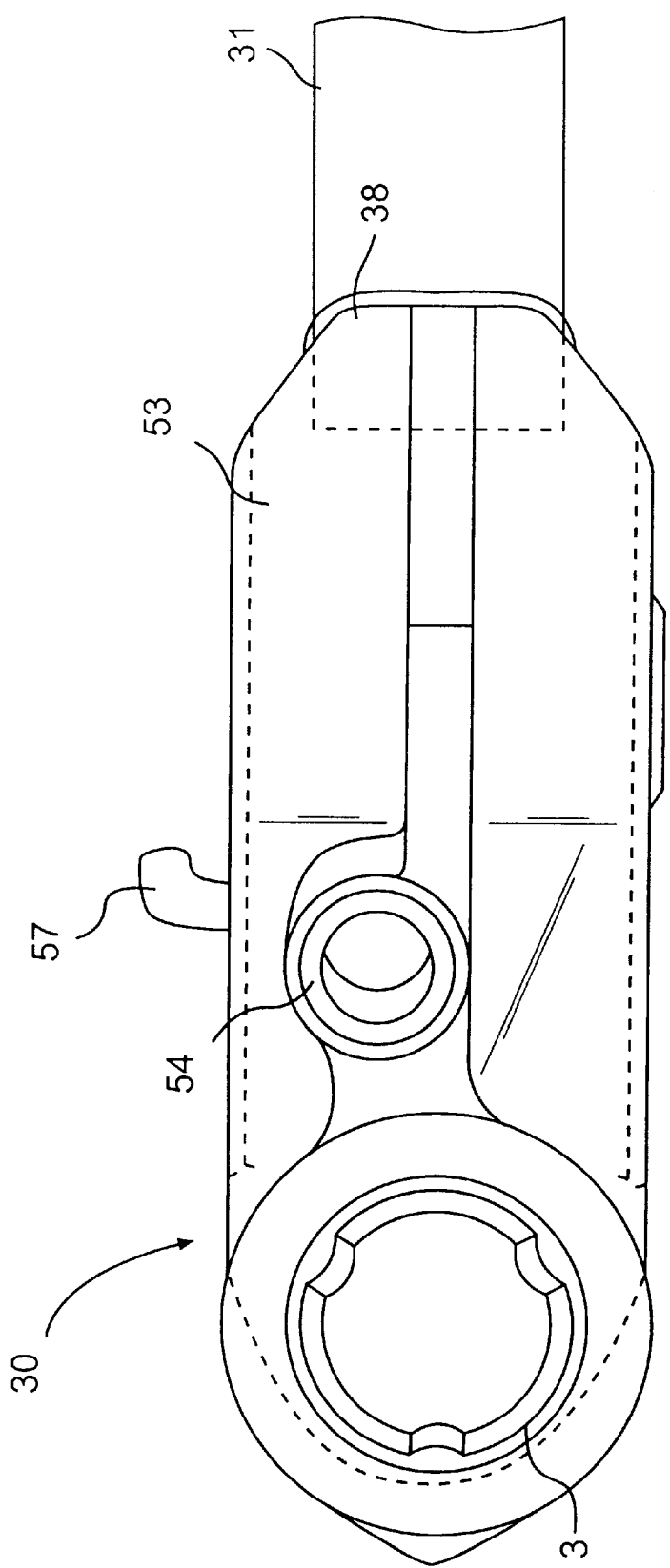
FIG. 5 is a plan view of a head portion.

FIG. 3 shows details of a front portion of the vehicle body frame 5 except for the rear stays 23 and the seat rails 24. The vehicle body frame 5 is formed in a loop-shape in side view by a head portion 30, a main pipe 31, a center pipe 32, a pivot frame 33, left and right lower pipes 34, a down pipe 35 and a reinforcement pipe 36. Among them, single ones of the main pipe 31, the center pipe 32, the pivot frame 33 and the down pipe 35 are respectively arranged along the center of the vehicle body, thus constituting a backbone type frame.

The head portion 30 is a hollow member cast by using a metal material such as an aluminum alloy or the like by integrating the head pipe 3 and a main body portion 37. The main body portion 37 is provided with a joint portion 38 for connection to the main pipe 31 and a joint portion 39 for connection to the down pipe 35. The main pipe 31 is a straight square pipe member formed of a metal material such as an aluminum alloy or the like. The main pipe 31 is fitted to a cylindrical portion of the joint portion 38, a front end portion of which is formed in a square cross-section having the same shape as the main pipe 31, and bonded thereto by welding.

A rear end portion of the main pipe 31 is obliquely cut and is brought into contact with and welded to an upper end portion of the center pipe 32 which is similarly obliquely cut. Side faces of the bonded portion of the main pipe 31 are reinforced by gussets 40. The center pipe 32 is a straight square pipe member formed of a metal material such as an aluminum alloy or the like. The center pipe 32 has a cross-section similar to that of the main pipe 31.

A bracket 43 is welded on a rear face side of the center pipe 32 in the vicinity of a portion bonded with the main pipe 31. The bracket 43 has an attachment portion 41 to be attached with the seat rails 24 and an attachment portion 42 to be attached with the rear cushion unit 16. The center pipe 32 extends downwardly on the rear side of the engine 8, and a lower end portion thereof is obliquely cut, fitted and welded to an upper end portion of the pivot frame 33 having a square cylinder shape.

The pivot frame 33 is fabricated by casting an aluminum alloy and constitutes a substantially channel-like shape which is opened to the front side. An upper portion of the pivot frame 33 includes an engine hanger attaching portion 44, and an intermediary portion thereof includes a pivot coupling portion 15a. A lower end portion thereof includes lower pipe joint portions 45 having a square cylinder shape projected to the front side on the left and on the right, to which respective rear end portions of the left and right lower pipes 34 are fitted and welded.

The lower pipes 34 are each arranged in the forward and rearward direction on the lower side of the engine 8. An intermediary portion of the lower pipes 34 include an engine hanger 46, and a front end portion thereof is bent upwardly and is connected to a lower portion of a joint piece 47. The joint piece 47 is also a casting of an aluminum alloy or the like. An upper portion of the joint piece is connected to a lower end portion of the down pipe 35. The joint piece 47 constitutes the oil tank along with the down pipe 45 and the head portion 30.

Figure 1:
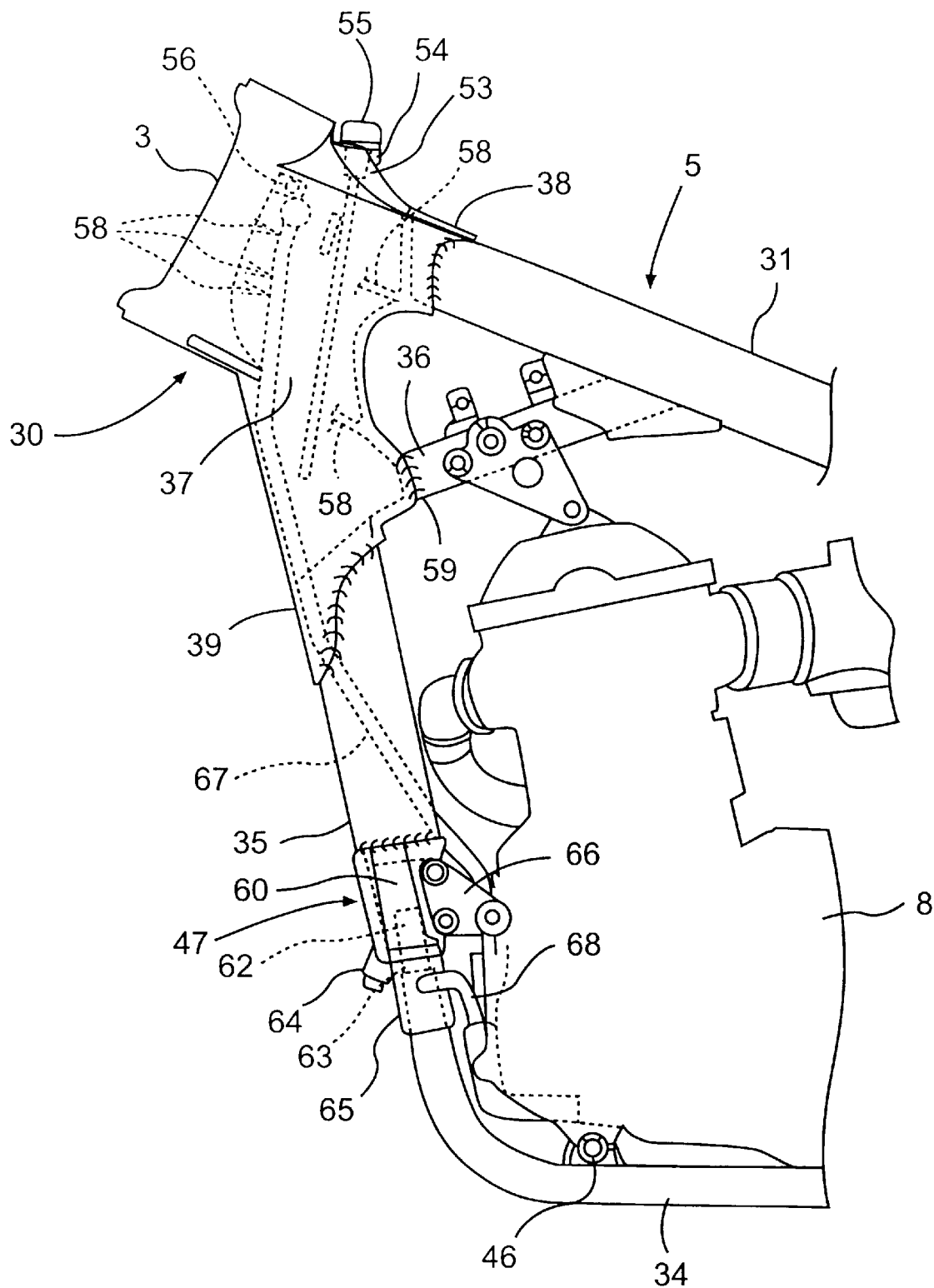
FIG. 1 is a side view of a portion of a vehicle body showing a portion of an oil tank according to an embodiment.

Next, a detailed explanation will be given of the head portion 30 and the oil tank with reference to FIGS. 1 and 3–6. As is apparent from FIG. 4, in the main body portion 37, the head pipe 3 and a tank space 50 are partitioned by a cylinder wall 51. The tank space 50 is also partitioned by a seal wall 52 at the joint portion 38. A top wall 53 of the tank space 50 includes a gauge boss 54 to which an oil level gauge 55 is attachably and detachably installed (FIG. 1).

An oil intake port 56 is located in a side wall of the tank space 50 on the right side of the vehicle body. Also, a breather pipe 57 extends outwardly from the side wall of the tank space 50 and communicates with an interior of an upper space of the engine 8. A number of ribs 58 are integrally formed inside of the tank space 50, to extend inwardly (refer to FIG. 6). Further, a vertical wall 58a connecting front and rear sides are formed as a portion thereof.

Figure 6:
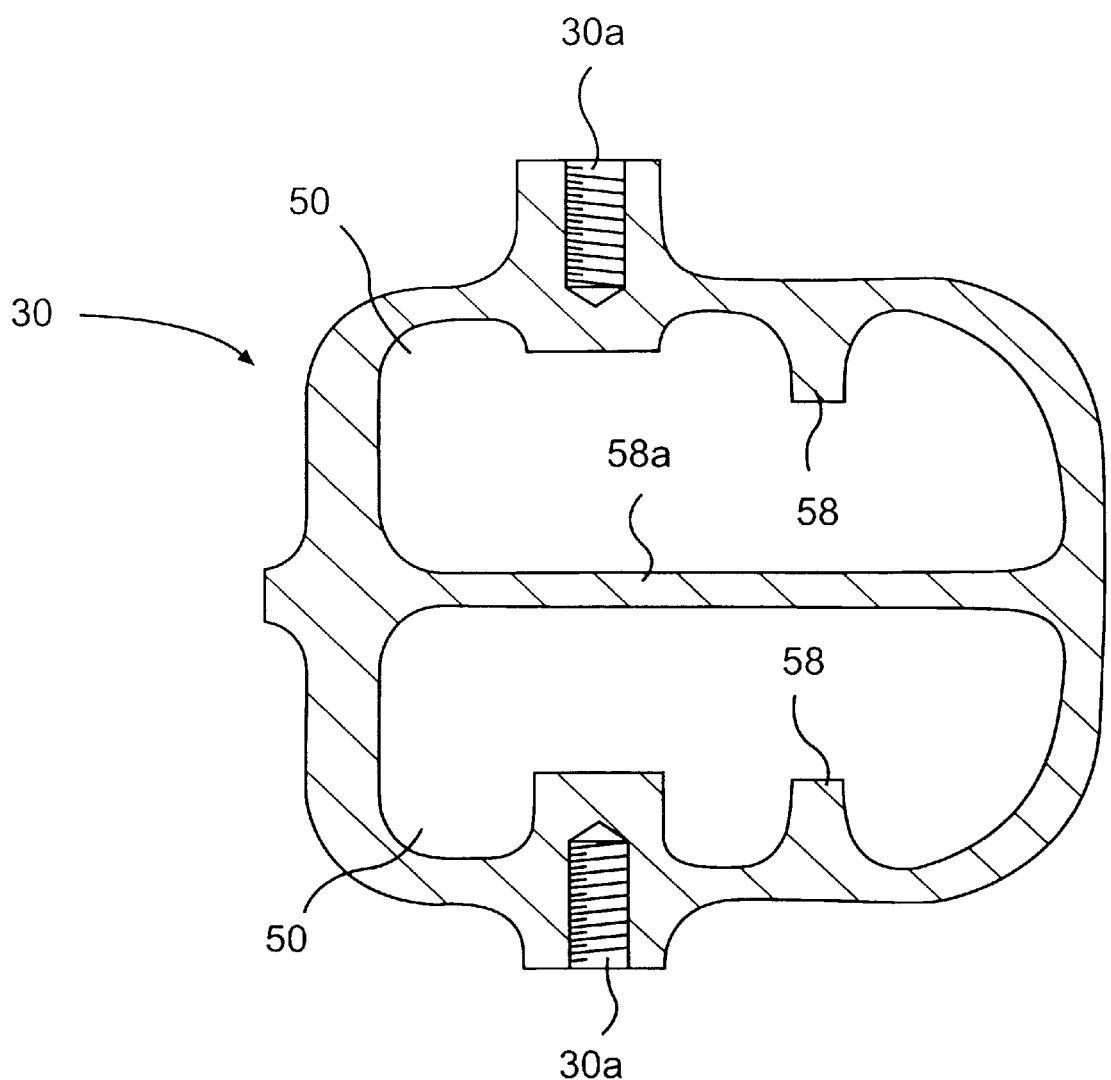
FIG. 6 is a sectional view taken along a line 6—6 of FIG. 3.

Numeral 30a in FIG. 6 designates a boss formed at a side face of the head portion 30 for attaching an upper portion of the radiator 9. Further, numeral 59 in FIGS. 1, 3 and 4 designates a recess portion for fitting a front end side of the reinforcement pipe 36, which is integrally formed with an outer surface side of a wall face constituting the main body portion 37.

Figure 7:
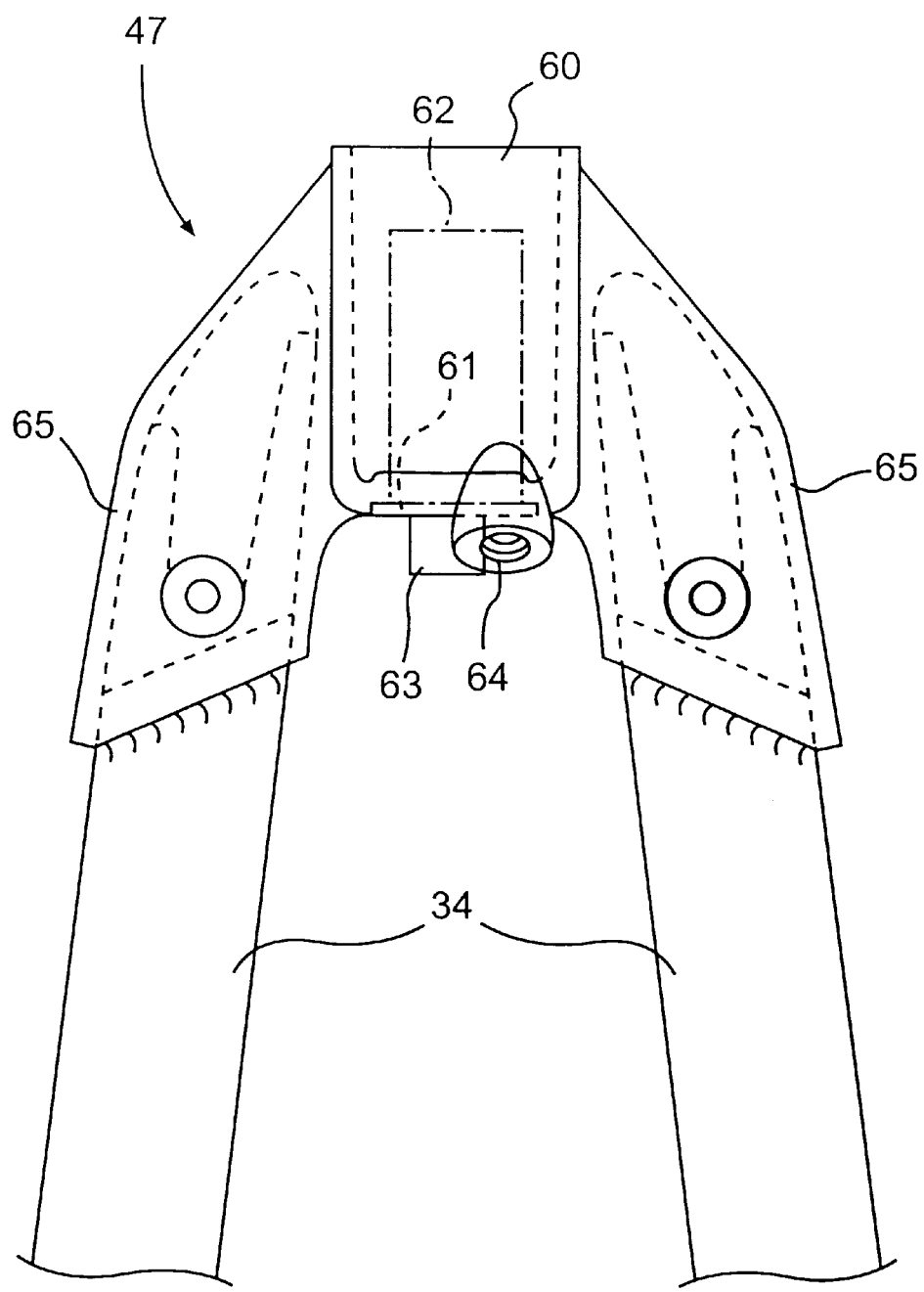
FIG. 7 is a front view in the direction of arrow A shown in FIG. 3.

FIG. 7 shows a detailed structure of the joint piece 47. A main body portion 60 at the center constitutes a cylindrical shape opened upwardly, to which a lower end portion of the down pipe 35 is fitted. At a bottom portion of the main body portion 60, an attachment hole 61 is opened to direct downwardly. A strainer 62 is inserted into the main body 60 therefrom and is screwed to the bottom portion of the main body portion 60. A joint portion 63 of the strainer 62 is projected downwardly from the attachment hole 61. A drain hole 64 is formed to project forwardly toward a lower oblique direction on the front side of the attachment hole 61.

Both left and right sides of the main body portion 60 are integrally formed with a forked joint portion 65 in a cylindrical shape opened downwardly, to which front end portions of the lower pipes 34 are fitted and welded. An engine hanger 66 is attached to a rear face side of the main body portion 60 (FIG. 1).

As shown in FIG. 1, a first oil pump installed at the engine 8 and the oil intake port 56 of the head portion 30 are communicated with each other by a supply pipe 67. The joint portion 63 of the strainer 62 attached to the joint piece 47 and a second oil pump installed at the engine 8 are connected by a return pipe 68.

Oil heated by the engine 8 enters an upper portion of the oil tank from the oil intake port 56 of the tank space 50. The heated oil moves downwardly in the oil tank from the tank space 50 into the down pipe 35 while being cooled. The oil finally returns again to the engine 8 from the strainer 62 to thereby circulate between the oil tank and the engine 8.

Next, an explanation will be given of the operation of the preferred embodiment. The oil tank according to the preferred embodiment is formed of three parts: the head portion 30, the down pipe 35 and the joint piece 47. The head portion 30 and the joint piece 47 are castings and accordingly, the only welds requiring liquid-tight performance are the joint portion 39 connecting the head portion to the down pipe 35, and the joint portion connecting the down pipe 35 to the joint piece 47. Therefore, the number and lengths of the welds requiring liquid-tight performance necessitating time and labor can be made as small as possible and as short as possible. Further, the oil tank can be integrated into the frame, which is easy to assemble.

In the present invention, by having the seal wall 52 integrally installed with the joint portion 38, the area between the tank space 50 and the main pipe 31 are cut off and separated. Accordingly, there is no need to hermetically seal the main pipe 31 by using a special member such as a plug. Also, the plurality of ribs 58 integrally formed with the inner portion of the head portion 30 provide sufficient strength and rigidity even when a large capacity tank space 50 is provided inside of the head portion 30 inherently requiring high strength and high rigidity. The surface area inside of the tank space 50 is increased and accordingly, heat radiation of the heated oil can be expedited and the cooling efficiency can be promoted. Further, when the material of the head portion 30 is constituted of an aluminum alloy, the cooling efficiency can further be promoted by utilizing the excellent heat conduction performance thereof.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A frame-integrated oil tank structure for a motorcycle comprising:

a vehicle body frame including a head portion integrally formed with a head pipe, a main pipe extending rearwardly from the head portion and passing by an upper side of an engine, and a down pipe extending downwardly at a front side of the engine;

said head portion comprising a hollow casting integrally formed with a main body portion having joint portions respectively joining with the main pipe, the down pipe and the head pipe, wherein an oil tank is constituted by communicating inner spaces of the main body portion and the down pipe, and wherein the joint portion joining with the main pipe is integrally formed with a seal wall for prohibiting the oil tank from communicating with the main pipe.

2. The frame-integrated oil tank structure according to claim 1, further comprising a plurality of ribs integrally formed in the inner space of the main body portion.

3. The frame-integrated oil tank structure according to claim 2, wherein said ribs extend inwardly from opposite side walls of said main body portion.

4. The frame-integrated oil tank structure according to claim 1, said main body portion including front and back walls, and further comprising a vertical wall member located within said inner space of said main body portion, said vertical wall member interconnecting said front wall with said back wall.

5. The frame-integrated oil tank structure according to claim 1, further comprising a gauge boss extending from a wall of said main body portion for attachment of an oil pressure gauge thereto.

6. The frame-integrated oil tank structure according to claim 1, further comprising a breather pipe extending from a wall of said main body portion for attachment to a crankcase of said engine of said motorcycle.

7. The frame-integrated oil tank structure according to claim 1, further comprising an oil inlet port located in a wall of said main body portion.

8. A frame-integrated oil tank structure for a motorcycle comprising:

a head member having a head pipe attached thereto;

a main pipe attached to said head member and extending rearwardly therefrom;

a down pipe having a first end attached to said head member and extending downwardly therefrom;

said head member and said down pipe each having hollow interior portions communicating with one another to form an oil tank; and said head member including a seal wall formed integrally therewith, said seal wall being located between said hollow interior portion of said head member and said main pipe to prevent oil located within said oil tank from entering said main pipe.

9. The frame-integrated oil tank structure according to claim 8, further comprising a plurality of ribs located within said hollow interior portion of said head member.

10. The frame-integrated oil tank structure according to claim 9, wherein said ribs extend inwardly from opposite side walls of said head member.

11. The frame-integrated oil tank structure according to claim 8, said head member including front and back walls, and further comprising a vertical wall member located within said hollow interior portion of said head member, said vertical wall member interconnecting said front wall with said back wall.

12. The frame-integrated oil tank structure according to claim 8, further comprising a gauge boss extending from a wall of said head member for attachment of an oil pressure gauge thereto.

13. The frame-integrated oil tank structure according to claim 8, further comprising a breather pipe extending from a wall of said head member for attachment to a crankcase of an engine of said motorcycle.

14. The frame-integrated oil tank structure according to claim 8, further comprising an oil inlet port located in a wall of said head member.

15. The frame-integrated oil tank structure according to claim 8, further comprising a joint piece attached to a second end of said down pipe for closing said second end of said down pipe to prevent oil located within said oil tank from leaking from said second end of said down pipe.

16. The frame-integrated oil tank structure according to claim 15, further comprising an oil strainer located within said joint piece.

17. The frame-integrated oil tank structure according to claim 16, further comprising an oil outlet port located in said joint piece and below said oil strainer.

18. The frame-integrated oil tank structure according to claim 8, wherein said head member is a casting of an aluminum alloy.

19. The frame-integrated oil tank structure according to claim 8, said head member further comprising:

a front wall, a back wall, and opposite side walls;

a plurality of ribs located within said hollow interior portion of said head member, said ribs extending inwardly from said opposite side walls of said head member; and a vertical wall member located within said hollow interior portion of said head member, said vertical wall member interconnecting said front wall with said back wall.

20. The frame-integrated oil tank structure according to claim 19, further comprising:

an oil inlet port located in one of said walls of said head member;

a joint piece attached to a second end of said down pipe for closing said second end of said down pipe to prevent oil located within said oil tank from leaking from said second end of said down pipe;

an oil strainer located within said joint piece; and an oil outlet port located in said joint piece and below said oil strainer.

* * * * *